US008014502B2

(12) United States Patent
Ozeki

(10) Patent No.: US 8,014,502 B2

(45) Date of Patent: Sep. 6, 2011

(54) COMMUNICATION DEVICE

(75) Inventor: Shinichiro Ozeki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1337 days.

(21) Appl. No.: 11/468,635

(22) Filed: Aug. 30, 2006

(65) Prior Publication Data

US 2007/0071199 A1 Mar. 29, 2007

(30) Foreign Application Priority Data

Sep. 7, 2005 (JP) ................................ 2005-259436

(51) Int. Cl.
*H04M 11/00* (2006.01)
*G06F 7/04* (2006.01)

(52) U.S. Cl. .................................... 379/100.01; 726/29

(58) Field of Classification Search .................... 726/10, 726/14, 22, 226, 7, 29; 709/206, 224; 713/155, 713/156, 164, 168; 379/100.01
See application file for complete search history.

(56) References Cited

U.S. PATENT DOCUMENTS

| | | | | |
|---|---|---|---|---|
| 6,370,567 | B1 * | 4/2002 | Ouchi | 709/206 |
| 7,647,376 | B1 * | 1/2010 | Jagger et al. | 709/206 |
| 7,689,716 | B2 * | 3/2010 | Short et al. | 709/246 |
| 2003/0164986 | A1 * | 9/2003 | Boire-Lavigne et al. | 358/400 |
| 2005/0044248 | A1 * | 2/2005 | Mihira et al. | 709/229 |
| 2005/0278533 | A1 * | 12/2005 | Mayer | 713/170 |
| 2006/0064753 | A1 * | 3/2006 | Otake et al. | 726/19 |
| 2007/0297587 | A1 * | 12/2007 | Urban et al. | 379/142.17 |
| 2010/0002260 | A1 * | 1/2010 | Naylor et al. | 358/1.15 |

FOREIGN PATENT DOCUMENTS

| | | |
|---|---|---|
| JP | 2002-109166 | 4/2002 |
| JP | 2002-325169 | 11/2002 |
| JP | 2003-186810 | 7/2003 |
| JP | 2004-72326 | 3/2004 |
| JP | 2005-63417 | 3/2005 |
| JP | 2005-212436 | 8/2005 |
| JP | 2005-217879 | 8/2005 |

OTHER PUBLICATIONS

Office Action issued Sep. 14, 2010 in JP Application No. 2005-259436.

* cited by examiner

*Primary Examiner* — Fan Tsang
*Assistant Examiner* — Mohammad Islam
(74) *Attorney, Agent, or Firm* — Oblon, Spivak, McClelland, Maier & Neustadt, L.L.P.

(57) ABSTRACT

A communication device includes a network control device connected to a Public Switched Telephone Network; an interface connected to an IP network; an operations control part configured to set an address corresponding to the Public Switched Telephone Network and another address corresponding to the IP network for an authorizing person who permits transmission; and a system control part configured to implement sending to the address corresponding to the Public Switched Telephone Network. The system control part determines whether sending permission is necessary; e-mail including the address corresponding to the Public Switched Telephone Network is sent to the other address of at least one said authorizing person if the sending permission is necessary; and sending to the address corresponding to the Public Switched Telephone Network is implemented in a case where e-mail including the sending permission from the authorizing person is received.

15 Claims, 15 Drawing Sheets

FIG.13

| SENDER ID | E-MAIL ADDRESS OF SENDER | E-MAIL ADDRESS OF AUTHORIZING PERSON | E-MAIL ADDRESS OF A PERSON DEPUTING AUTHORIZATION |
|---|---|---|---|
| 1 | katsuo@isono.co.jp | namihei@isono.co.jp | sazae@isono.co.jp |
| 2 | wakame@isono.co.jp | fune@isono.co.jp | sazae@isono.co.jp |

FIG.14

| FILE NUMBER | DAY AND TIME OF STORING | SENDER ID | PSTN NUMBER | NUMBER ATTRIBUTION | AUTHORIZING PERSON | STATUS | Message-ID |
|---|---|---|---|---|---|---|---|
| 1000 | 050509 14:43:55 | 1 | 03-3456 -7890 | SHORTEN DIAL 3 | namihei@isono.co.jp | WAIT FOR AUTHORIZATION | A9876543.210987 |

FIG.15

KATSUO REQUESTS FACSIMILE TRANSMISSION
DAY AND TIME OF STORING=050509 14:43:55
OPPONENT=03-3456-7890(SHORT DIALING 3):ABC COMPANY

PLEASE REPLY AS FOLLOWING CONDITIONS.

IF AUTHORIZING, WRITE "AUTHORIZATION" IN THE TEXT.
IF NOT AUTHORIZING, WRITE "DENIAL" IN THE TEXT.
WHEN ADDRESS IS CORRECTED, WRITE "CORRECTION=03-3456-7899" IN THE TEXT.
WHEN REQUESTING STATUS, WRITE "STATUS" IN THE TEXT.
WHEN REQUESTING NEXT OPPONENT OF AUTHORIZATION, WRITE "NEXT AUTHORIZATION = fune@isono.co.jp

IF NO RESPONSE WITHIN 3 HOURS, RESENDING IS DONE.

FIG.16

| WAIT FOR AUTHORIZATION |
|---|
| AUTHORIZATION |
| WAIT FOR AUTHORIZATION OF RESENDING |
| WAIT FOR AUTHORIZATION OF DEPUTING AUTHORIZATION |
| AUTHORIZED AND SEND |
| AFTER ADDRESS IS CORRECTED, AUTHORIZATION IS MADE AND SEND |
| SEND WITHOUT AUTHORIZATION |
| FILE DELETION WITHOUT AUTHORIZATION |

COMMUNICATION DEVICE

BACKGROUND OF THE INVENTION

1. Field of the Invention

The present invention relates to communication devices, and more particularly, a communication device for facsimile communication.

2. Description of the Related Art

As a measure taken to avoid error input of a called party number in facsimile communication, there is one-touch transmission or shortened dialing (abbreviated dialing or speed dialing).

On the other hand, Japan Laid-Open Patent Application No. 2004-72326 discloses that the result of facsimile transmission is confirmed by e-mail as transmission confirmation using e-mail.

However, the above-mentioned related art has the following problems.

First, since the one-touch transmission or the shortened dialing (abbreviated dialing or speed dialing) cannot be used for a new opponent (device or person to be called), there is no fundamental measure taken to reduce the error transmissions. Second, there is no way to confirm whether one-touch is pressed in error.

SUMMARY OF THE INVENTION

Accordingly, embodiments of the present invention may provide a novel and useful communication device whereby error transmission can be reduced.

More specifically, the embodiments of the present invention may provide a communication device, including: a network control device connected to a Public Switched Telephone Network; an interface connected to an IP network; an operations control part configured to set an address corresponding to the Public Switched Telephone Network and another address corresponding to the IP network for an authorizing person who permits transmission; and a system control part configured to implement sending to the address corresponding to the Public Switched Telephone Network; wherein the system control part determines whether sending permission is necessary; e-mail including the address corresponding to the Public Switched Telephone Network is sent to the other address of at least one said authorizing person if the sending permission is necessary; and sending to the address corresponding to the Public Switched Telephone Network is implemented in a case where e-mail including the sending permission from the authorizing person is received.

The system control part may determines that the sending permission is not necessary in a case where calling is made to the address that is registered in advance and corresponds to the Public Switched Telephone Network. The communication may further include a password identification part configured to identify a password that is input; wherein the system control part determines whether the sending permission is necessary based on a result of the identification.

The system control part may implement at least one of sending a file stored corresponding to a reference of the e-mail to the Public Switched Telephone Network, sending e-mail to an opponent of next authorization, sending the stored file whose address is changed to the Public Switched Telephone Network, replying by sending a status of the stored file to an e-mail sender, and deletion of the stored file and sending e-mail indicating the deletion to the sender and the authorizing person, based on at least one of the reference of received e-mail, the sender of the received e-mail, and a text of the received e-mail.

The system control part may send a PSTN number and a name of the opponent to the authorizing person simultaneously. The system control part may send a PSTN number and information of one of one-touch dialing, shortened dialing and manual input to the authorizing person. The communication device may further include a storing part configured to store e-mail address of the authorizing person; wherein in a case where the facsimile is transmitted, the system control part sets the e-mail address of the authorizing person that is set in advance and requests the authorization by a designated protocol.

The storing part may store the e-mail address of the authorizing person while the e-mail address of the authorizing person and a sender are linked; and in a case where the facsimile is transmitted, the system control part may request the authorizing person corresponding to the sender to authorize the transmission by the designated protocol. In a case where the sending file is deleted before the system control part receives e-mail including the sending permission from the authorizing person, the system control part may send e-mail indicating the deletion of the file to the authorizing person.

The communication device may further include a storing part configured to store the time when the authorizing person permits sending; wherein the system control part may send information indicating the authorizing person and the time when the authorizing person permits sending or outputs information about the authorizing person and the time when the authorizing person permits sending in a communication management report. In a case where e-mail including sending permission is not received within a designated time from the authorizing person, the system control part may implement one of resending e-mail to a sender and the authorizing person, deleting the stored manuscript and sending the sender e-mail indicating the deletion, and deleting the stored manuscript and outputting and sending the transmission result report.

The operations control part may set a deputizing authorizing person who deputizes a deputy authorization person; and in a case where the facsimile is sent and e-mail including the sending permission is not received from the authorizing person within a designated time, the system control part may send e-mail to the deputy authorizing person who is registered. The communication device may further include a time setting part configured to set a time for a designated time out.

According to the above-mentioned embodiments of the present invention, it is possible to provide a communication device whereby authorization of the address of facsimile transmission is obtained by e-mail so that a third party other than a sender can check the address, and the authorizing person determines an opponent of the facsimile transmission so that transmission can be securely made without causing an address error. Hence, it is possible to reduce the error transmissions.

Other objects, features, and advantages of the present invention will become more apparent from the following detailed description when read in conjunction with the accompanying drawings.

BRIEF DESCRIPTION OF THE DRAWINGS

FIG. 13 is an example of a table whereby e-mail addresses are managed;

FIG. 14 is an example of a managing table in a case where authorization is requested;

FIG. 15 is an example of the text of e-mail that is sent to the authorizing person; and FIG. 16 is a view for explaining parameters showing the status at the managing table in a case where the authorization is requested.

DETAILED DESCRIPTION OF THE PREFERRED EMBODIMENTS

Figure 1:
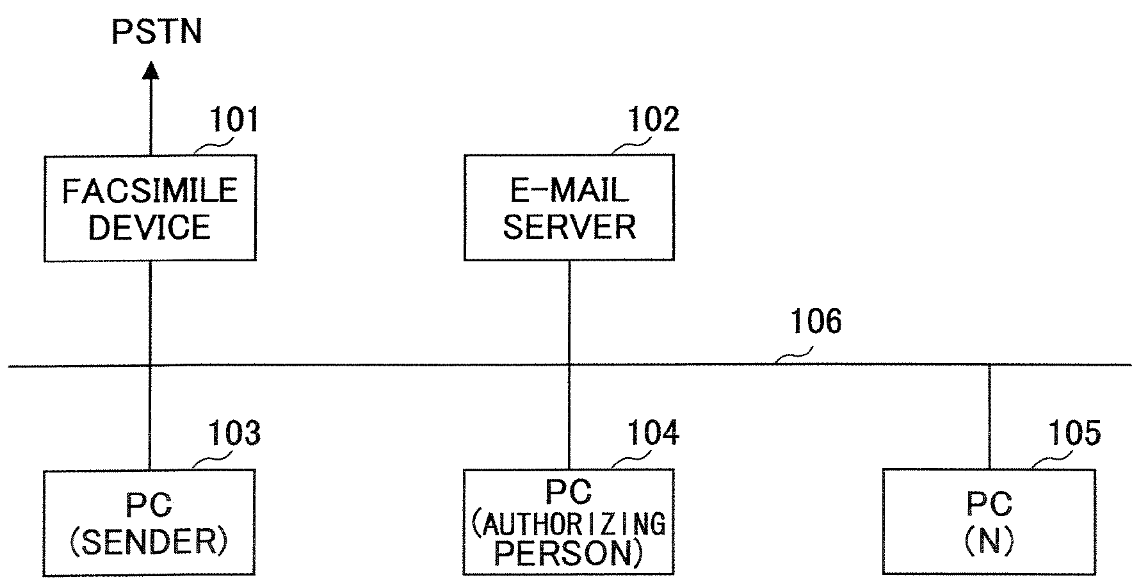
FIG. 1 is a block diagram showing an example of an operational environment of a communication device of an example of the present invention.

A description of the present invention is now given, with reference to FIG. 1 through FIG. 16, including embodiments of the present invention.

In all drawings used for explaining the embodiment of the present invention, parts that have the same function are given the same reference numerals, and explanation thereof is omitted.

First, an operational environment of a communication device of an example of the present invention such as a facsimile communication device is discussed with reference to FIG. 1.

Here, FIG. 1 is a block diagram showing an example of the operational environment of the facsimile communication device of the example of the present invention.

A facsimile device 101 of the example of the present invention, an e-mail server 102, a PC 103, a PC 104, and a PC 105 are connected to each other by a LAN (Local Area Network) 106. The facsimile device 101 is also connected to a PSTN (Public Switched Telephone Network). The e-mail server 102 sends and receives e-mails by SMTP or POP3.

The PC 103, PC 104 and PC 105 are personal computers which can send and receive e-mails. In this example, the PC 103 is a personal computer which a person originating facsimile transmission uses. The PC 104 is a personal computer which a person authorizing the facsimile transmission uses. The PC 105 is a personal computer which a normal user uses.

Figure 2:
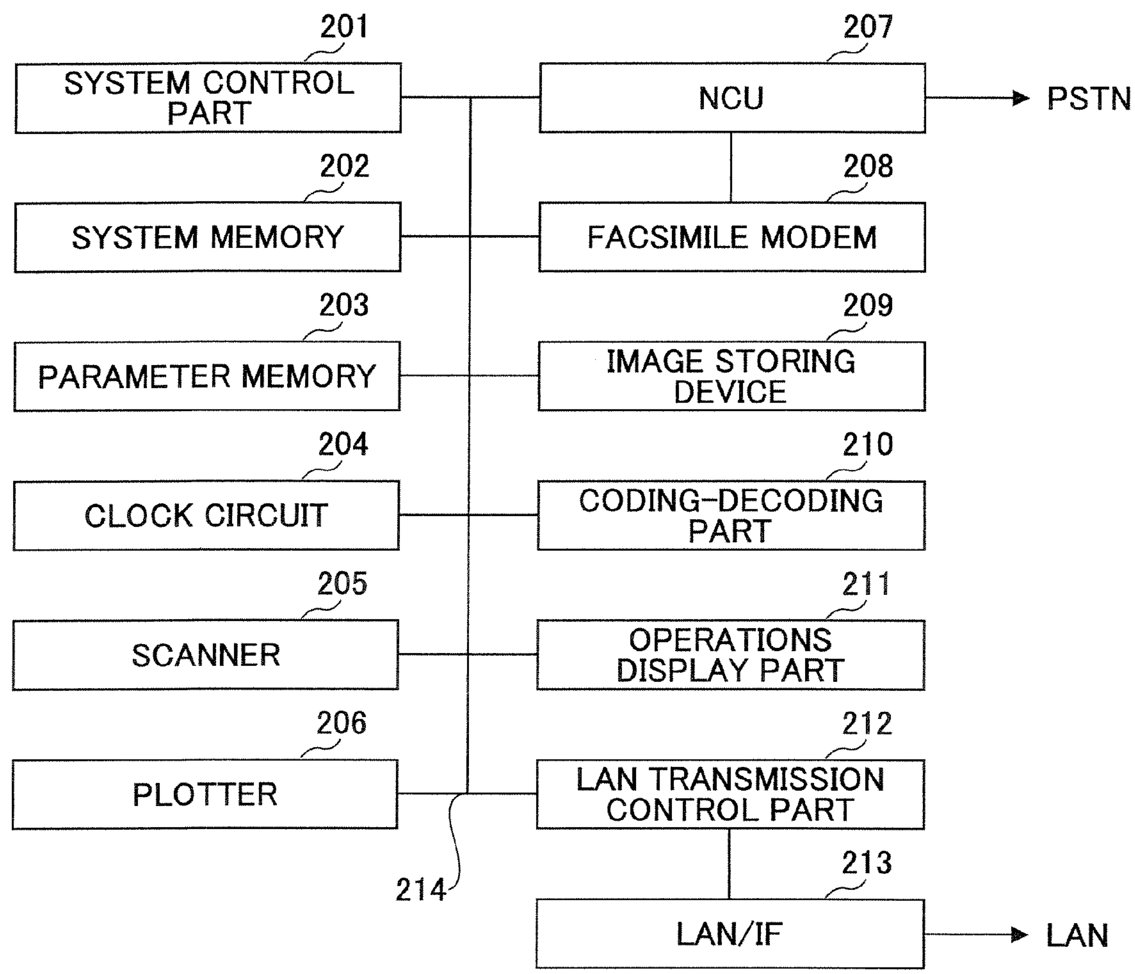
FIG. 2 is a block diagram showing the communication device of the example of the present invention.

Next, a structure of the facsimile device 101 of the example of the present invention is discussed with reference to FIG. 2. Here, FIG. 2 is a block diagram showing the facsimile communication device 101 of the example of the present invention.

The facsimile device 101 of the example of the present invention includes a system control part 201, a system memory 202, a parameter memory 203, a clock circuit 204, a scanner 205, a plotter 206, an NCU (Network Control Unit) 207, a facsimile modem 208, an image storing device 209, a coding-decoding part 210, an operations display part 211, and a LAN transmission control part 212. In addition, the facsimile device 101 has a LAN/IF 213 connected to the LAN transmission control part 212.

The system control part 201, the system memory 202, the parameter memory 203, the clock circuit 204, the scanner 205, the plotter 206, the NCU (Network Control Unit) 207, the facsimile modem 208, the image storing device 209, the coding-decoding part 210, the operations display part 211, and the LAN transmission control part 212 are connected to each other by an internal bus 214.

The NCU 207 is connected to a PSTN (Public Switched Telephone Network). The LAN/IF 213 is connected to LAN (Local Area Network).

The system control part 201 implements various control processes such as control of parts of the facsimile device 101 or a facsimile transmission control process.

The system memory 202 stores various data necessary when the system control part 201 implements a control process program or process program and composes a page memory for a file output or a work area of the system control part 201.

The parameter memory 203 stores information peculiar to the facsimile device 101. The clock circuit 204 outputs information of present time.

The scanner 205 reads an image of a manuscript at a designated resolution. The plotter 206 records and outputs the image at a designated resolution. The NCU 207 is connected to an analog public network PSTN.

The facsimile modem 208 is formed by, for example, a GS facsimile modem so as to realize a modem function. For example, the facsimile modem 208 includes a low speed modem (V. 21) and a high speed modem (V. 17, V. 34, V. 29, V. 27 ter). The low speed modem (V. 21) is used for exchanging a transmission procedure signal. The high speed modem (V. 17, V. 34, V. 29, V. 27 ter) is used mainly for exchanging picture (image) information.

The image storing device 209 stores encoded and compressed picture (image) information.

The coding-decoding part 210 encodes and compresses picture (image) information, and decodes the encoded and compressed picture (image) information to be original picture (image) information.

The operations display part 211 is used for operating the facsimile device 101 and includes various operations keys and various display devices.

The LAN transmission control part 212 implements a communication control process of various designated protocols for exchanging data with other data terminal devices via the LAN. The LAN transmission control part 212 is connected to the LAN via the LAN interface 213. The NCU 207 and the facsimile modem 208 directly exchange data.

Here, exchange of data between terminals connected to the LAN is implemented by combining a transmission protocol for a transport layer that is called TCP/IP and a protocol of an upper layer. A communication protocol such as TCP/IP, SMTP, or POP and a data format or data structure of e-mail are stated by an RFC document issued by ITF. For example, TCP is stated by RFC 793, IP is stated by RFC 793, SMTP is stated by RFC 821, and an e-mail format is stated by RFC 822, RFC 1521, RFC 1522, and others. Furthermore, as following ITU-Telecommunication standardization sector .37 and RFC 2301-2306, an image is converted to TIFF-F and attached to e-mail.

Figure 3:
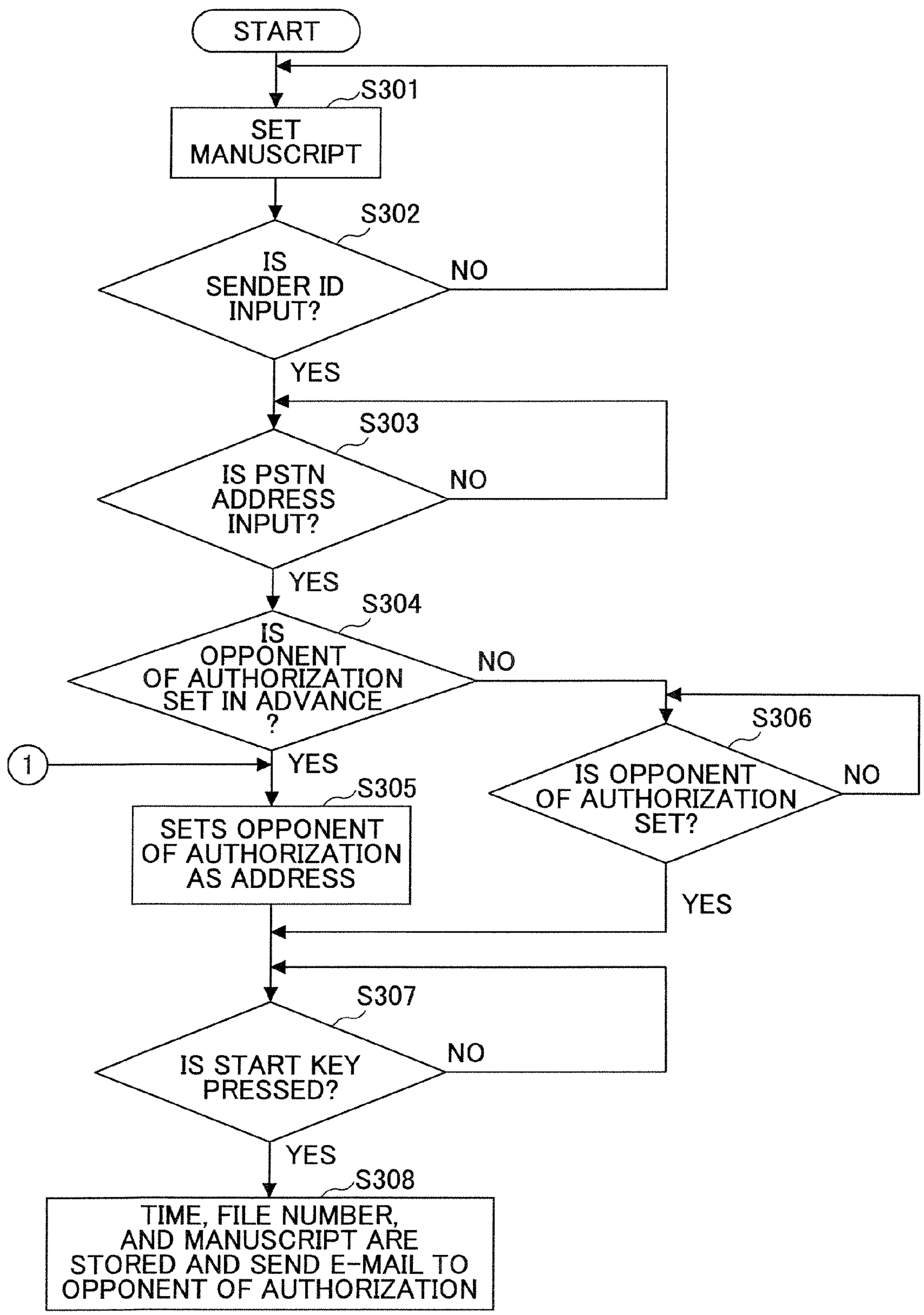
FIG. 3 is a flowchart showing operations of the communication device of the example of the present invention.

Next, a procedure for actually implementing facsimile transmission is discussed with reference to FIG. 3. Here, FIG. 3 is a flowchart showing operations of the communication device 101 of the example of the present invention.

First, a manuscript is set in step 301. The system control part 201 determines whether a sender ID is input in step 302.

If the sender ID is not input (NO in step 302), the process goes back to step 301. On the other hand, if the sender ID is input (YES in step 302), the system control part 201 determines whether a PSTN address is input in step 303.

If the PSTN address is not input (NO in step 303), the process goes back to step 303. On the other hand, if the PSTN address is input (YES in step 303), the system control part 201 determines whether an opponent of authorization is set in advance in step 304.

If the opponent of authorization is set in advance (YES in step 304), the system control part 201 sets the opponent of authorization as address of e-mail in step 305 and determines whether a start key is pressed in step 307.

If the start key is not pressed (NO in step 307), the process goes back to the step 307. On the other hand, if the start key is pressed (YES in step 307), the system control part 201 orders the LAN transmission control part 212 to e-mail the opponent of authorization about stored time, a file number and the manuscript in step 308. As a result of this, e-mail is transmitted to the opponent of authorization via the LAN/IF 213.

If the opponent of authorization is not set in advance (NO in step 304), the system control part 201 determines whether the opponent of authorization is set in step 306.

If the opponent of authorization is not set (NO in step 306), the process goes back to step 306. On the other hand, if the opponent of authorization is set (YES in step 306), the process goes to step 307.

Next, a procedure at the time of receiving e-mail is discussed with reference to FIG. 4A through FIG. 4D. Here, FIGS. 4A-4D are flowcharts showing operations at the time of receiving e-mail, of the communication device in an example embodiment of the present invention.

A sender in this explanation means a user who requests to use the PSTN for the facsimile transmission and sends e-mail to the authorizing person.

First, the system control part 201 determines whether Reference of received e-mail is consistent with a Message-ID of e-mail that is a subject of authorization in step 401.

If the Reference of received e-mail is not consistent with the Message-ID of e-mail that is the subject of authorization (No in step 401), the e-mail is received and printed in step 402. On the other hand, if the Reference of received e-mail is consistent with the Message-ID of e-mail that is the subject of authorization (YES in step 401), the system control part 201 determines whether instruction in the text of the e-mail is an authorization in step 410.

If the instruction in the text of the e-mail is an authorization (YES in step 410), the system control part 201 determines whether the e-mail is from the authorizing person in step 411.

If the e-mail is from the authorizing person (YES in step 411), the system control part 201 changes a status from "waiting for authorization" to "authorization" in step 413. On the other hand, if the e-mail is not from the authorizing person (NO in step 411), nothing is transmitted so that the procedure ends in step 412.

Next, if YES in step 411, whether authorizations are obtained from all authorizing persons is determined in step 414. If the authorizations are not obtained from all authorizing persons (NO in step 414), nothing is transmitted so that the procedure ends in step 415.

On the other hand, if the authorizations are obtained from all of authorizing persons (YES in step 414), the system control part 201 implements a sending process to the PSTN and sends e-mail of sending completion to the sender in step 416. As a result of this, the facsimile transmission is implemented in the PSTN via the NCU 207.

Figure 4A:
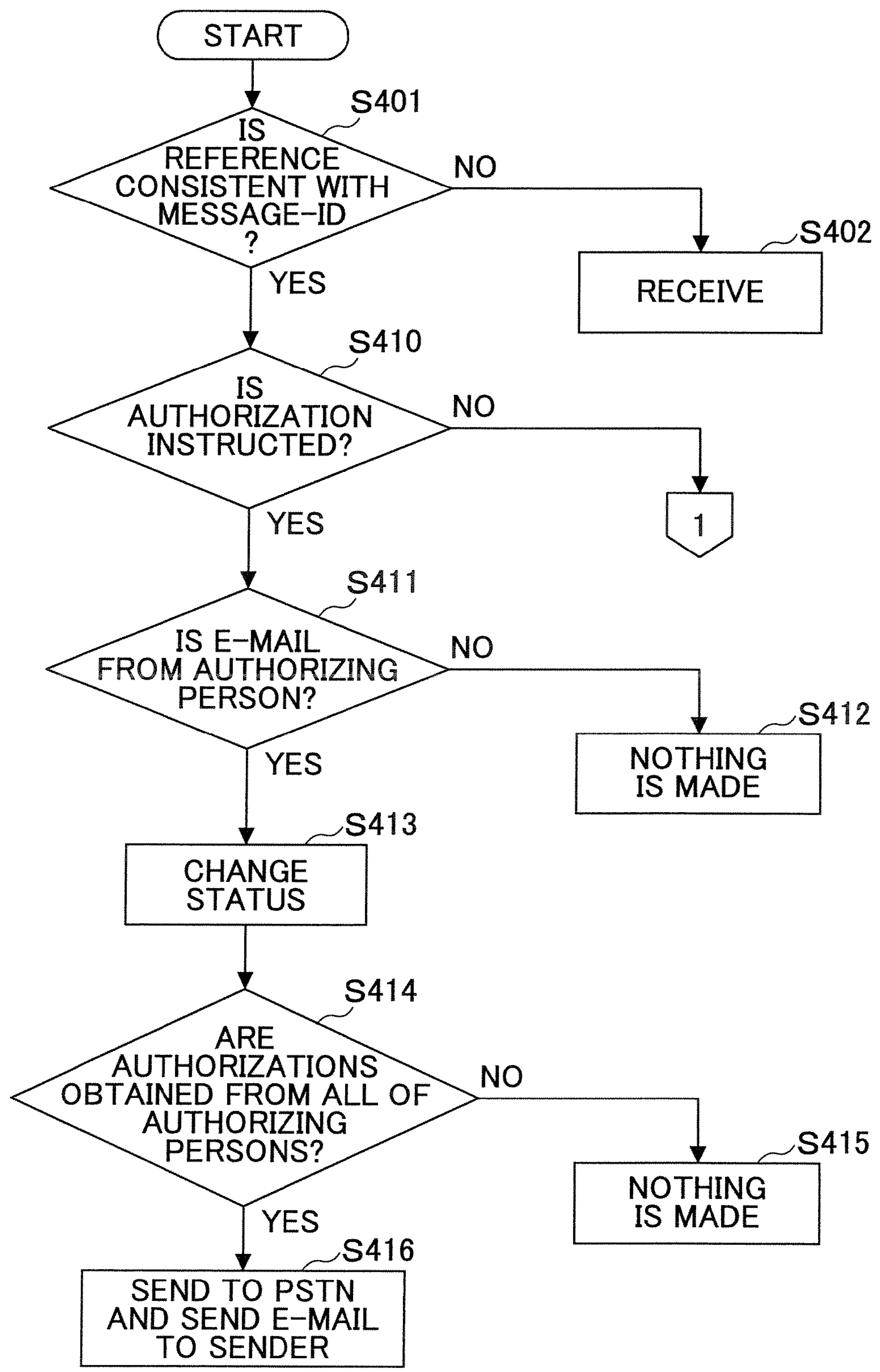
FIG. 4A is a first flowchart showing operations at the time of receiving e-mail, of the communication device of the example of the present invention.
Figure 4B:
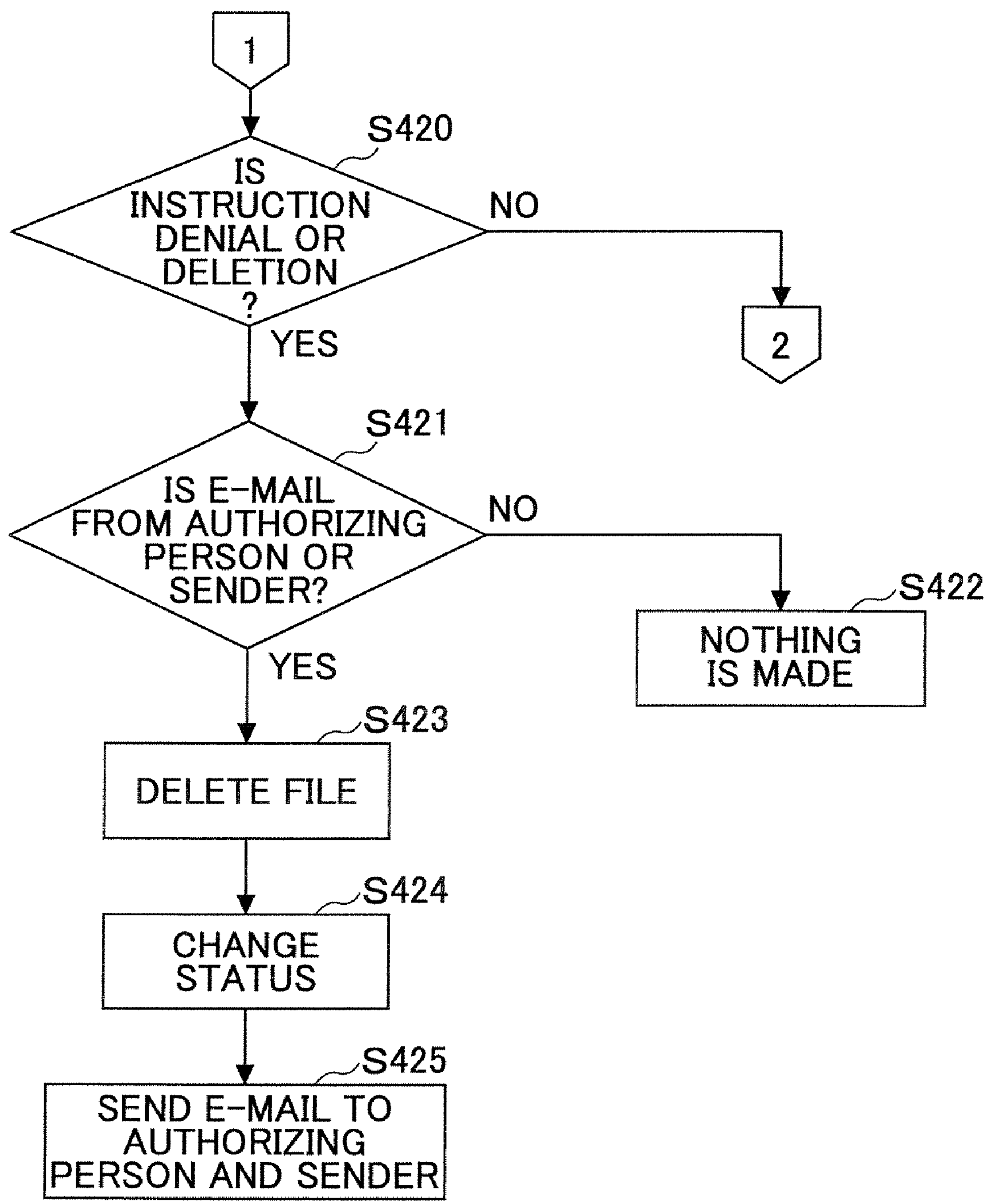
FIG. 4B is a second flowchart showing operations at the time of receiving e-mail, of the communication device of the example of the present invention.

Next, a case where the instruction in the text is "not authorization" in step 410 is discussed with reference to FIG. 4B.

If the instruction in the text is not authorization (NO in step 410), the system control part 201 determines whether the instruction is denial or deletion in step 420.

If the instruction is denial or deletion (YES in step 420), the system control part 201 determines whether the e-mail is from the authorizing person or the sender in step 421.

If the e-mail is not from the authorizing person or the sender (NO in step 421), nothing is transmitted and the procedure ends in step 422. On the other hand, if the e-mail is from the authorizing person or the sender (YES in step 421), the system control part 201 deletes the file in step 423, changes the status to "not authorized, and delete file" in step 424, and sends e-mail indicating deletion of the file to the authorizing person and the sender in step 425.

Figure 4C:
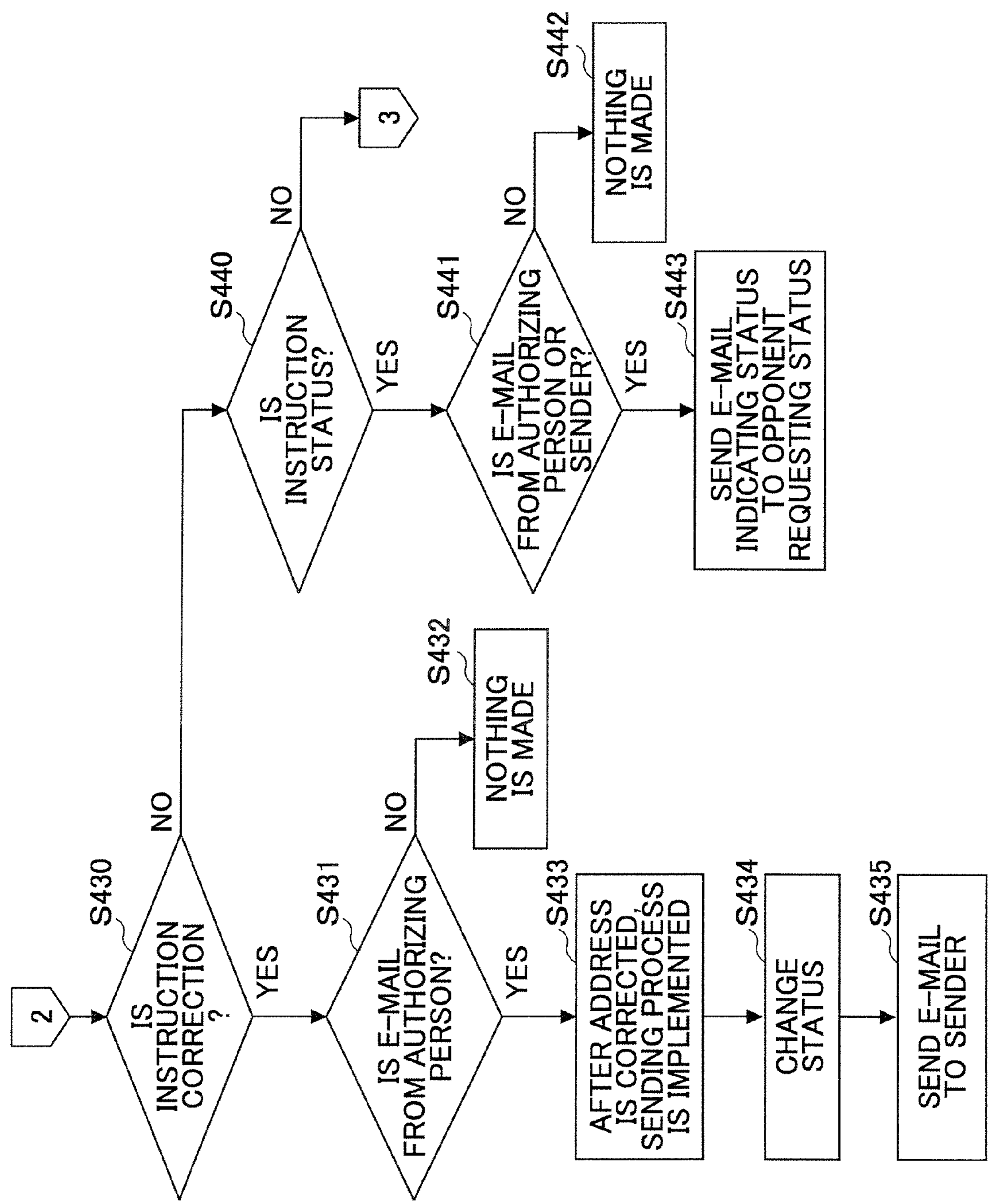
FIG. 4C is a third flowchart showing operations at the time of receiving e-mail, of the communication device of the example of the present invention.

Next, a case where the instruction in the text is not denial or deletion in step 420 is discussed with reference to FIG. 4C.

If the instruction in the text is not denial or deletion (NO in step 420), the system control part 201 determines whether the instruction is correction in step 430. If the instruction is correction (YES in step 430), the system control part 201 determines whether the e-mail is from the authorizing person in step 431.

If the e-mail is not from the authorizing person (NO in step 431), nothing is transmitted so that the procedure ends in step 432. On the other hand, if the e-mail is from the authorizing person (YES in step 431), the system control part 201 sends the address of corrected PSTN in step 433. As a result of this, the facsimile transmission to the PSTN is transmitted via the NCU 207. The system control part 201 changes the status to "after the address is corrected, authorization is made and sending process is implemented" in step 434 so as to send e-mail to the sender in step 435.

If the instruction is not correction (NO in step 430), the system control part 201 determines whether the instruction is status in step 440.

If the instruction is status (YES in step 440), the system control part 201 determines whether the e-mail is from the authorizing person or the sender in step 441. If the e-mail is not from the authorizing person or the sender (NO in step 441), nothing is transmitted and the procedure ends in step 442. If the e-mail is from the authorizing person or the sender (YES in step 441), the system control part 201 sends e-mail indicating the status to an opponent requesting the status in step 443.

Figure 4D:
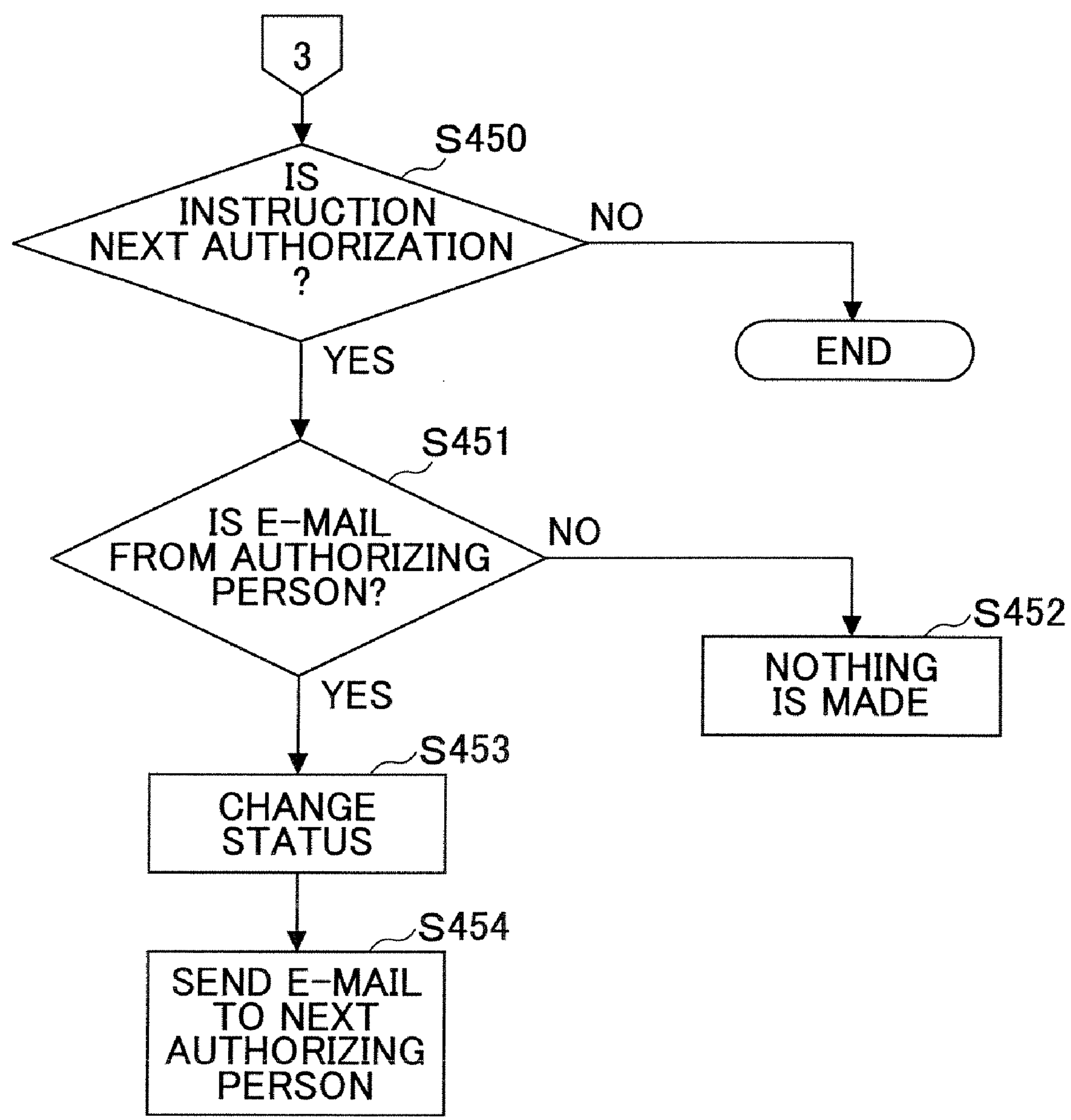
FIG. 4D is a fourth flowchart showing operations at the time of receiving e-mail, of the communication device of the example of the present invention.

Next, a case where the instruction in the text is "not status" in step 440 is discussed with reference to FIG. 4D.

If the instruction in the text is not status (NO in step 440), the system control part 201 determines whether the instruction is next authorization in step 450.

If the instruction in the text of the e-mail is next authorization (YES in step 450), the system control part 201 determines whether the e-mail is from the authorizing person in step 451. On the other hand, if the instruction is not next authorization (NO in step 450), nothing is transmitted so that the procedure ends.

If the e-mail is from the authorizing person (YES in step 451), the system control part 201 changes a status to "waiting for authorization" in step 453 and sends image (picture) information and the address to the next authorizing person in step 454. On the other hand, if the e-mail is not from the authorizing person (NO in step 451), nothing is transmitted so that the procedure ends in step 452.

Figure 5:
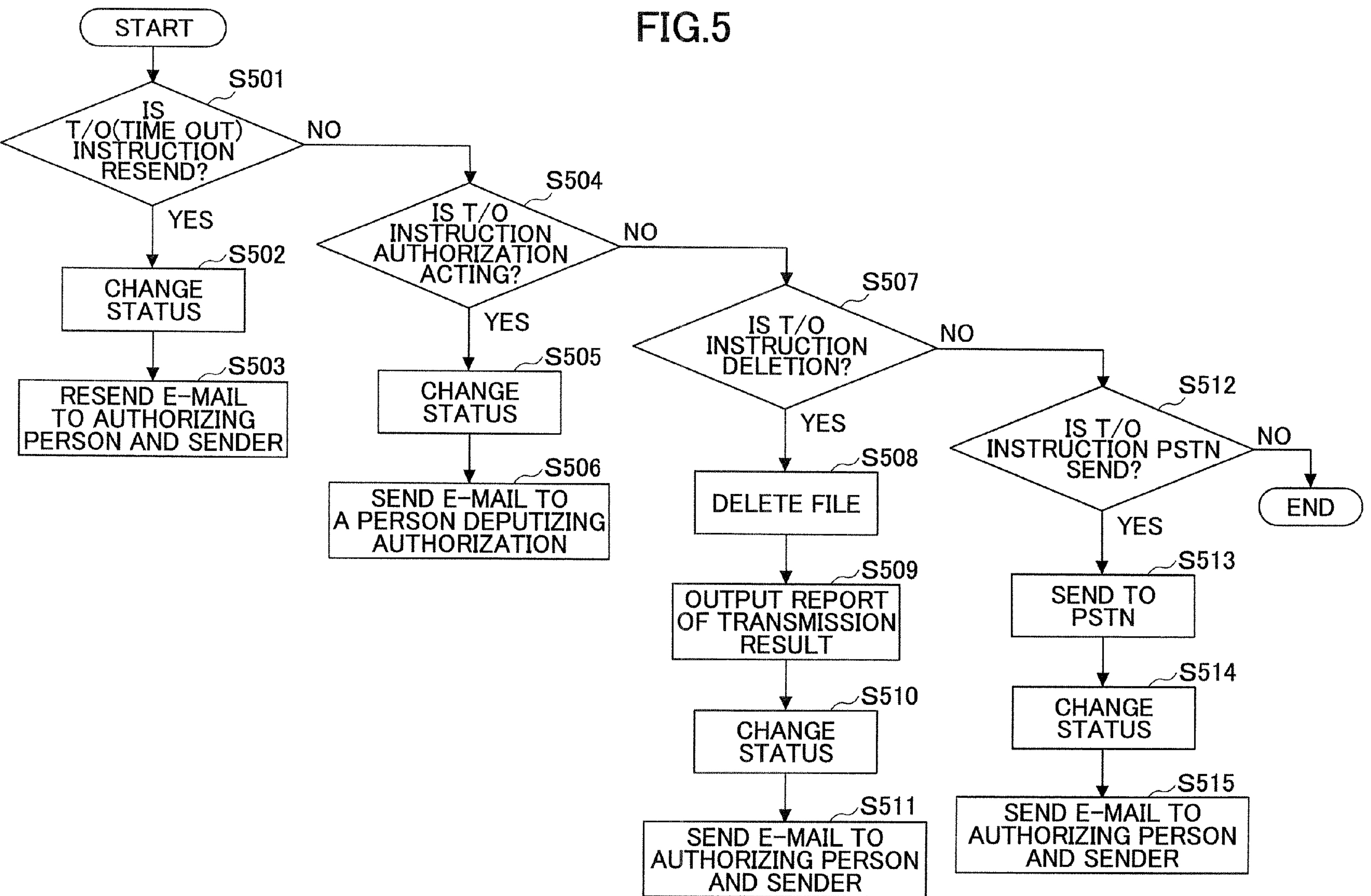
FIG. 5 is a flowchart showing a process at the time of time out after e-mail is sent, of the example of the present invention.

Next, a process at the time of time out after e-mail is sent is discussed with reference to FIG. 5. Here, FIG. 5 is a flowchart showing the process at the time of time out after an e-mail is sent, in an example of one embodiment.

First, the system control part 201 determines whether T/O (time out) instruction is "resend" in step 501.

If the T/O (time out) instruction is "resend" (YES in step 501), the system control part 201 changes the status to "waiting for authorization of resend" in step 502 so as to resend e-mail to the authorizing person and the sender in step 503.

On the other hand, if the T/O (time out) instruction is not resend (NO in step 501), the system control part 201 determines whether the T/O instruction is authorization for deputizing in step 504.

If the T/O instruction is authorization for deputizing (YES in step 504), the system control part 201 changed the status to "waiting for authorization of authorization deputizing" in step 505, and sends e-mail to a person deputizing authorization in step 506. If the T/O instruction is not authorization deputizing (NO in step 504), the system control part 201 determines whether the T/O instruction is deletion in step 507.

If the T/O instruction is deletion (YES in step 507), the system control part 201 deletes the file in step 508, outputs a report of transmission result in step 509, changes the status to "not authorized, and delete file" in step 510, and sends an e-mail to the authorizing person and the sender in step 511.

On the other hand, if the T/O instruction is not deletion (NO in step 507), the system control part 201 determines whether the T/O instruction is PSTN send in step 512. If the T/O instruction is PSTN send (YES in step 512), the system control part 201 sends PSTN in step 513, changes the status to "not authorized, and send" in step 514, and sends an e-mail to the authorizing person and the sender in step 515. If the TIO instruction is not PSTN send (NO in step 512), the procedure ends.

Figure 6:
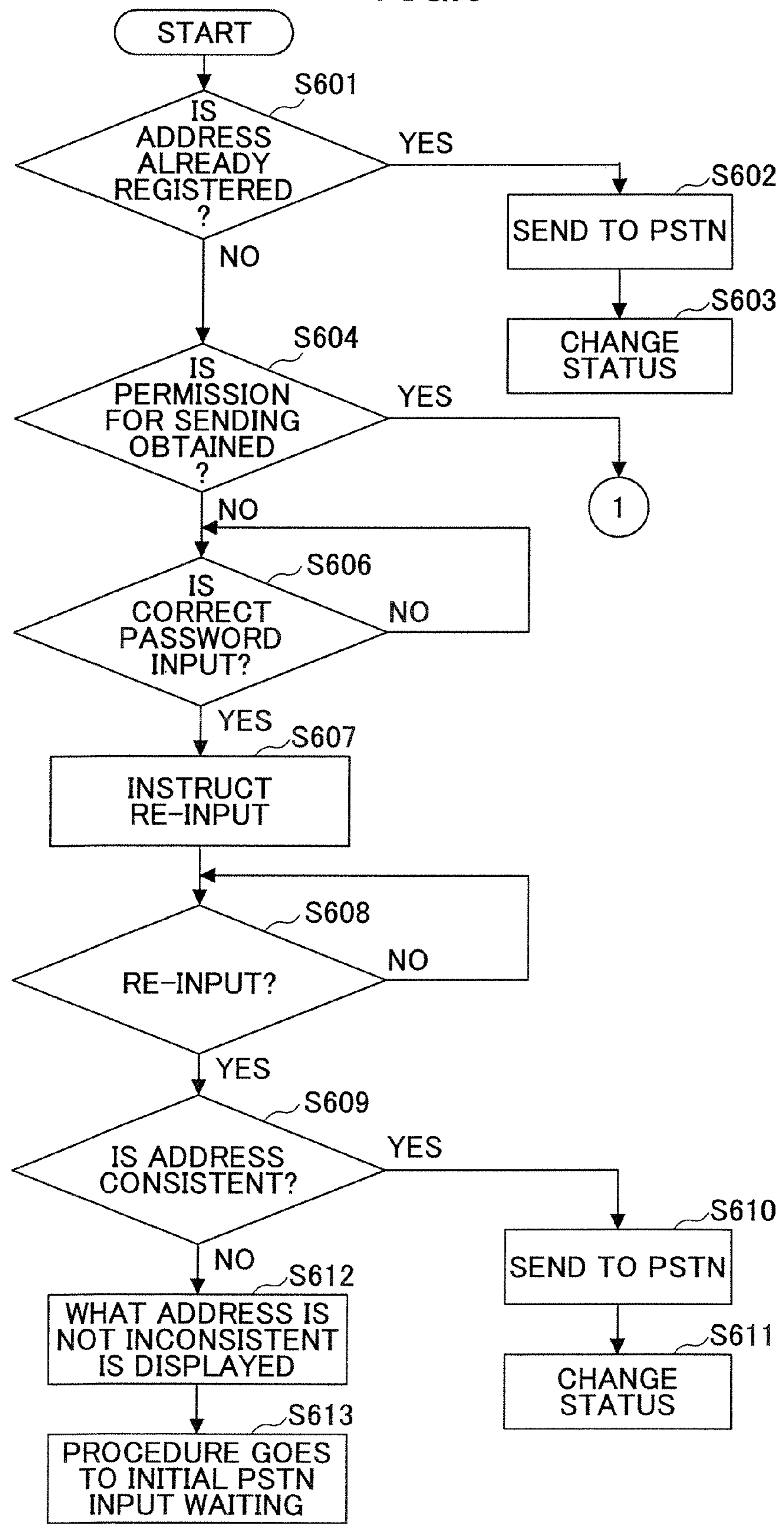
FIG. 6 is a flowchart showing operations of a process added after step 303, of the communication device of the example of the present invention.

Next, a process added after step 303 is discussed with reference to FIG. 6. Here, FIG. 6 is a flowchart showing operations of the process added after step 303, of the communication device of the example of the present invention;

First, the system control part 201 determines whether the address of PSTN is already registered as one-touch dialing or shorten dialing (abbreviated dialing or speed dialing), for example, in step 601.

If the address of PSTN is already registered (YES in step 601), the system control part 201 does not go through the authorization process and sends to the PSTN in step 602, and change the status to "not authorized, and sent" in step 603. On the other hand, if the address of PSTN is not registered (NO in step 601), the system control part 201 waits for instruction from the user regarding whether permission for sending is obtained in step 604.

If the permission for sending is obtained (YES in step 604), the process goes back to step 304. On the other hand, if the permission for sending is not obtained (NO in step 604), the system control part 201 encourages the sender to input a password and determines whether the correct password (set in advance) is input in step 606.

If the correct password is not input (No in step 606), the process goes back to step S606. On the other hand, if the correct password is input (YES in step 606), the system control part 201 instructs to input the address again in step 607 and determines whether the address is input again in step 608.

If the address is not input again (No in step 608), the process goes back to the step 608. If the address is input again (YES in step 608), the system control part 201 determines whether the address is consistent with a first address in step 609.

If the address is consistent with the first address (YES in step 609), the system control part 201 sends to the PSTN in step 610 and changes the status to "not authorized, and sent" in step 611. On the other hand, if the address is not consistent with the first address (NO in step 609), that the address is not consistent is displayed in step 612 and the process goes to an initial PSTN input waiting in step 613.

Figure 7:
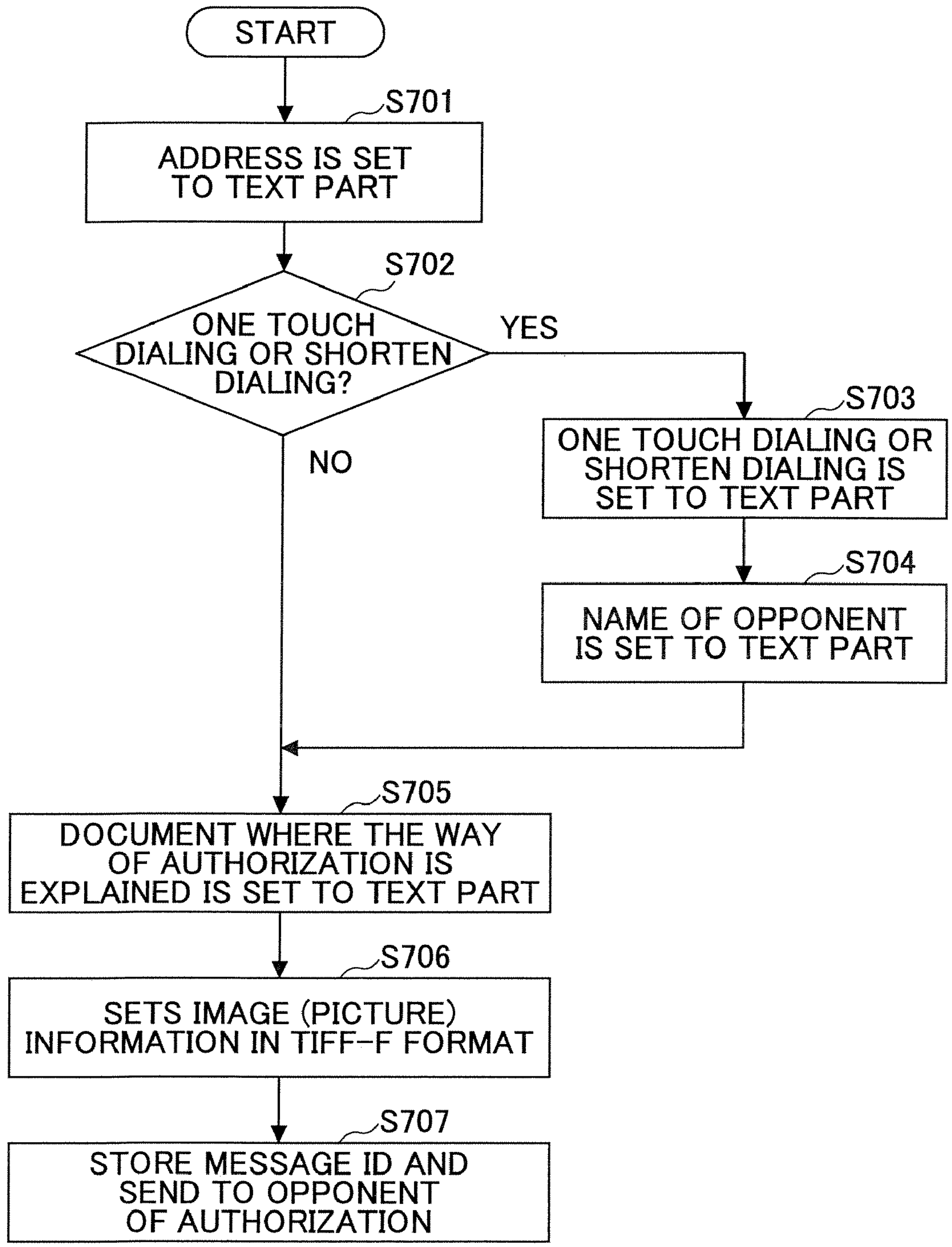
FIG. 7 is a flowchart showing operations of a process for sending e-mail to an authorizing person, of the communication device of the example of the present invention.

Next, a process for sending e-mail to the authorizing person is discussed with reference to FIG. 7. FIG. 7 is a flowchart showing operations of the process for sending e-mail to an authorizing person, of the communication device of the example of an embodiment of the present invention.

First, the PSTN address is set in the text part in step 701 and it is determined whether one-touch dialing or shortened dialing is to be performed in step 702. In a case where one-touch dialing or shortened dialing is to be performed (YES in step 702), the system control part 201 sets it in the text part in step 703 and sets the name of an opponent in the text part in step 704.

Next, the system control part sets the document where the way of authorization is explained in the text part in step 705.

Next, the LAN transmission control part 212 sets the image (picture) information in a TIFF-F format in step 706, stores the Message ID, and send to the opponent of authorization in step 707. As a result of this, e-mail is sent to the authorizing person via the LAN/IF 213.

In a case of not using the one-touch dialing or shortened dialing (NO in step 702), the procedure goes to the step 705 without going via the steps 703 and 704.

Figure 8:
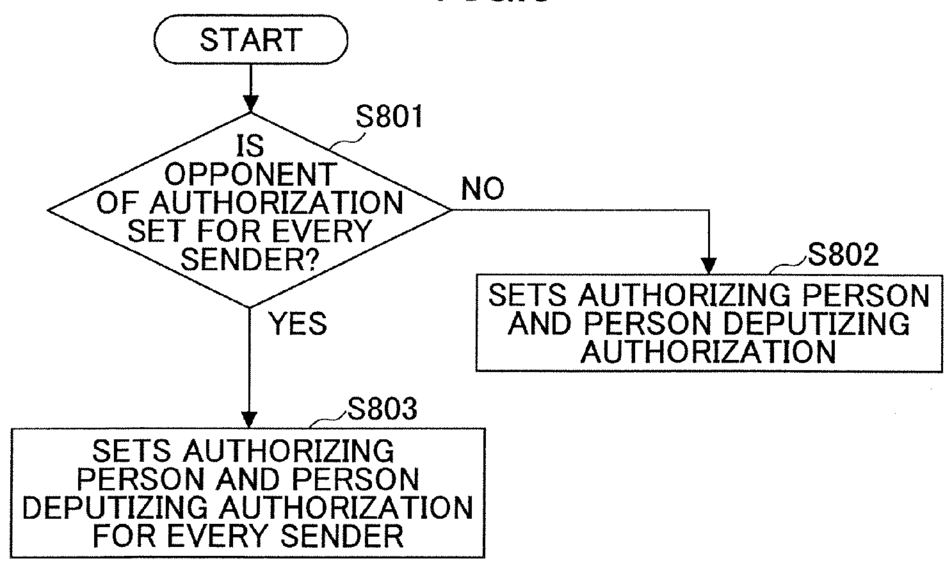
FIG. 8 is a flowchart showing operations of a process at the time of an opponent of authorization is input in advance, of the communication device of the example of the present invention.

Next, a process at the time of an opponent of authorization is input in advance is discussed with reference to FIG. 8. FIG. 8 is a flowchart showing operations of the process at the time of an opponent of authorization is input in advance, of the communication device of the example of the present invention.

First, the system control part 201 waits for instruction of the user regarding whether the opponent of authorization is set for every sender in step 801. If the opponent of authorization is not set for every sender (NO in step 801), the system control part 201 sets the authorizing person and a deputizing authorization person and the procedure ends in step 802.

On the other hand, if the opponent of authorization is set for every sender (YES in step 801), the system control part 201 sets an authorizing person and a deputizing authorization person for every sender and the procedure ends in step 803.

Figure 9:
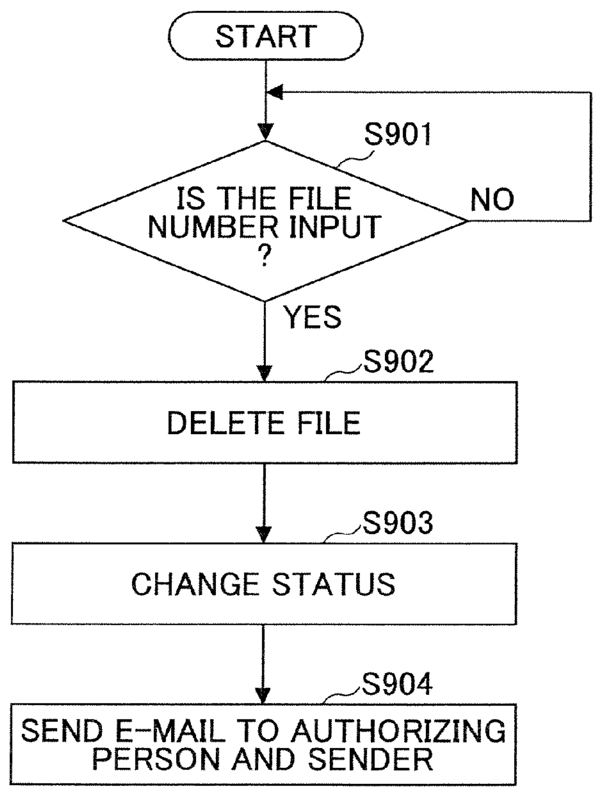
FIG. 9 is a flowchart showing operations of a process for file deletion, of the communication device of the example of the present invention.

Next, a process for file deletion is discussed with reference to FIG. 9. Here, FIG. 9 is a flowchart showing operations of the process for file deletion within the communication device in an example of one embodiment of the present invention.

The system control part 201 determines whether the file number to be deleted is input in step 901.

If the file number to be deleted is not input (No in step 901), the procedure goes back to step 901. On the other hand, if the file number to be deleted is input (YES in step 901), the system control part 201 deletes the file in step 902, changes the status to "not authorized, and delete the file" in step 903, and sends e-mail to the authorizing person and the sender in step 904.

Figure 10:
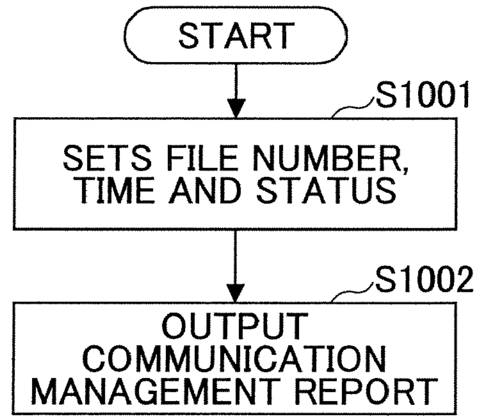
FIG. 10 is a flowchart showing operations of a process for outputting a communication management report, of the communication device of the example of the present invention.

Next, a process for outputting a communication management report is discussed with reference to FIG. 10. Here, FIG. 10 is a flowchart showing operations of the process for outputting a communication management report, of the communication device of the example of the present invention.

First, the system control part 201 sets the file number, time and status in a page memory of the system memory 202 in step 1001. The system control part 201 outputs a communication management report in step 1002.

Figure 11:
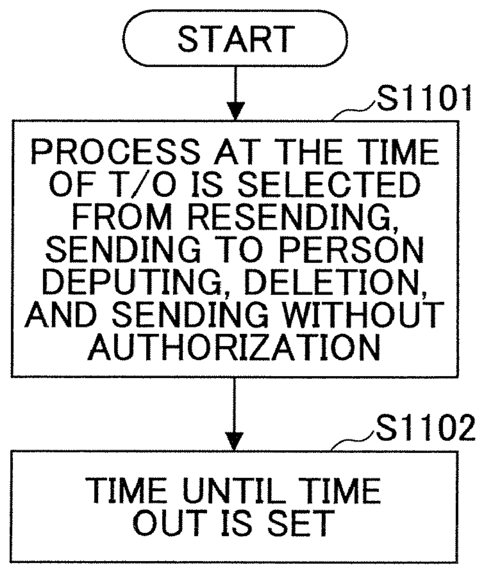
FIG. 11 is a flowchart showing operations of a process for setting a time of time out, of the communication device of the example of the present invention.

Next, a process for setting a time of time out is discussed with reference to FIG. 11. Here, FIG. 11 is a flowchart showing operations of the process for setting a time of time out, of the communication device of the example of the present invention.

First, a process at the time of time out is selected from resending, sending to a deputy authorizing person, deletion, and sending without authorization in step 1101. Next, a period for time out is set in step 1102.

Figure 12:
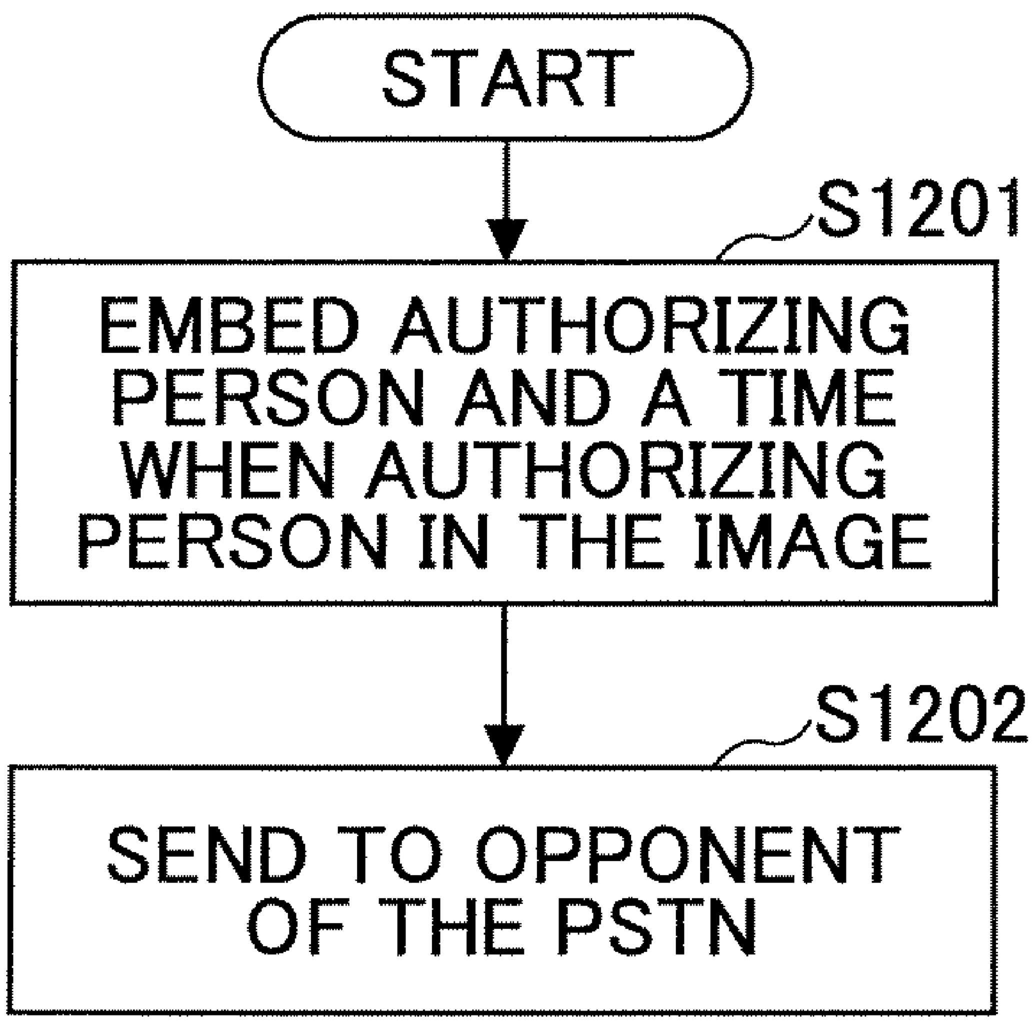
FIG. 12 is a flowchart showing operations of a process at the time of PSTN transmission, of the communication device of the example of the present invention.

Next, a process at the time of PSTN transmission is discussed with reference to FIG. 12. FIG. 12 is a flowchart showing operations of the process at the time of PSTN transmission, of the communication device of the example of the present invention.

First, the system control part 201 embeds the authorizing person and a time when the authorizing person authorized in an image in step 1201, and then sends the image to an opponent of the PSTN in step 1202.

Next, an example of a table whereby e-mail addresses are managed is discussed with reference to FIG. 13. Here, FIG. 13 is a table whereby e-mail addresses are managed. A sender ID, e-mail address of the sender, e-mail address of the authorizing person, and e-mail address of a deputy authorizing person are stored in the table for managing the e-mail addresses. Further, at least a part of the sender ID, e-mail address of the sender, e-mail address of the authorizing person, and e-mail address of the deputy authorizing person are related so as to be stored.

Next, an example of a managing table in a case where authorization is requested is discussed with reference to FIG. 14. FIG. 14 is a table showing the example of the managing table in a case where authorization is requested. In this table, the file number, day and time of storing, sender ID, PSTN number, number attribution, authorizing person, status, and Message-ID are managed.

Next, an example of the text of e-mail that is sent to the authorizing person is discussed with reference to FIG. 15. FIG. 15 is a view for explaining the example of the text of e-mail that is sent to the authorizing person.

In the e-mail that is sent to the authorizing person, information that indicates that the sender requests the facsimile transmission by the sender, day and time of storing, opponent, and the way for responding are described.

Next, parameters showing the status in the managing table in a case where the authorization is requested as discussed with reference to FIG. 14 is discussed with reference to FIG. 16. Here, FIG. 16 is a view for explaining the parameters showing a state at the managing table in a case where authorization is requested.

In the parameter indicating the status, there are items of "wait for authorization", "authorization", "wait for authorization of resending", "wait for authorization of deputing authorization", "authorized and sent", "after address is corrected, authorization was made and sent", "send without authorization" and "file deletion without authorization".

An opponent of PSTN sending may be an opponent using T. 37 or T. 38.

In addition, while the T. 37 protocol is used for the opponent of authorization in this example, the PSTN or T. 38 protocol may be used by using a sub-address or the like.

In addition, while the corresponding file is specified by the Reference of e-mail from the opponent of authorization in this example, the corresponding file may be specified by a different identifier. Furthermore, authorization by e-mail from the opponent of authorization or a sender or instruction of deletion may be inserted in the text or title of the e-mail following a first specific character in the text.

In addition, setting or a sending process can be instructed by the PC.

According to the communication device discussed above, it is possible to provide a communication device whereby authorization of the address of facsimile transmission is obtained by e-mail so that a third party other than a sender can check the address, and the authorizing person determines an opponent of the facsimile transmission so that transmission can be securely made without causing an address error. Hence, it is possible to reduce transmission errors.

In addition, the sending permission is not necessary in a case where calling is made to an address or number, corresponding to the PSTN (Public Switched Telephone Network) registered in advance such as one-touch dialing or shortened dialing, so that sending can be performed without authorization if authorization is not required because of one-touch dialing or shortened dialing.

Furthermore, the password identification part configured to identify a password that is input is provided in the system control part 201. Based on the result of the identification, whether the permission of sending is necessary is determined. Because of this, a password for not implementing the sending permission process can be input and sending can be implemented without authorization if the authoring person does not exist.

In addition, a selection screen for selecting whether sending permission is given at the time of sending is provided. If the sending permission is not given, the address may be required to be input plural times such as twice. Since the address should be input twice, a possibility of error transmission can be decreased.

The system control part 201 implements at least one of sending a file stored corresponding to the reference of the e-mail to the Public Switched Telephone Network, sending an e-mail to an opponent of next authorization, sending the stored file whose address is changed to the Public Switched Telephone Network, replying with the status of the stored file to an e-mail sender, and deletion of the stored file and sending e-mail indicating the deletion to the sender and the authorizing person, based on at least one of the reference of received e-mail, a sender of the received e-mail, and a text of the received e-mail.

Under this process, if the e-mail indicating authorization is received, since this e-mail is not printed, use of resources in vain can be prevented. In addition, since the status requirement can be found from the text of an e-mail, it is possible to make the sender or the authorizing person know the status of the document. Furthermore, an opponent of additional authorization can be assigned by an opponent of an initial authorization. Hence, more secure determine can be performed. In addition, since the authorizing person can delete the stored file, it is possible to use the device efficiently. Furthermore, since the authorizing person can change the address, an operations flow can be made efficient.

By sending the PSTN number and the name of the opponent to the authorizing person, it is possible for the authorizing person to easily determine whether a fax number is correct.

By sending to the sender whether input is done by one-touch dialing, shortened dialing or manual input, it is possible for the authorizing person to determine whether the number is correct.

In addition, a storing part configured to store the e-mail address of an authorizing person is provided in the facsimile device. When the facsimile is transmitted, the system control part 201 uses the e-mail address of the authorizing person that is set in advance and requests the authorization by a designated protocol. As a result of this, since an authorizing person is set in advance, it is possible to avoid setting the authorizing person at the time of sending.

While the e-mail address of the authorizing person and the sender are linked, the e-mail address of the authorizing person is stored in the storing part. When the facsimile is transmitted, the system control part 201 requests the authorizing person corresponding to the sender to authorize by a designated protocol. By doing this, since an authorizing person can be set for every sender, it is possible to make a proper person the authorizing person by setting the sending ID.

By making the number of the opponents of authorization plural, it is possible to determine more securely.

In a case where the sending file is deleted before the system control part 201 receives e-mail including the sending permission from the authorizing person, e-mail indicating the deletion of the file is sent to the authorizing person. Under this structure, when the sender deletes the file, since the opponent of authorization is notified of deletion, it is possible to transmit correct information to the opponent of authorization.

The storing part is provided in the facsimile device so as to store the time when the authorizing person permits sending. In this case, the system control part 201 sends information indicating the authorizing person and the time when the authorizing person permits sending or outputs the authorizing person and the time when the authorizing person permits sending in the communication management report. Because of this, the authorizing person or the time when the authorization is made is embedded in the sending image (picture) information. Hence, the receiver can determine whether the received document is authorized. In addition, since the authorizing person or the time when the authorization is made is recorded in the communication report, this information can be confirmed later.

In a case where e-mail including sending permission is not received within a designated time from the authorizing person, one of resending e-mail to the sender and the authorizing person, deleting the stored manuscript and sending the sender e-mail indicating the deletion, and deleting the stored manuscript and outputting and sending the transmission result report is implemented.

As a result of this, if the authorization is not obtained within a designated time, resending is encouraged. Thus, it is possible to prevent a situation where the authorization is delayed to the point that the facsimile transmission cannot be made. In addition, if authorization is not obtained within a designated time, the manuscript is deleted, the sender is notified of the deletion, and the transmission result report is printed. Hence, it is possible to use the device efficiently. Furthermore, since the manuscript is sent if the authorization is not obtained within a designated time, even if the authorization is not obtained, it is still possible to send the facsimile.

In addition, a deputy authorizing person who is deputized to perform the authorization can be set. In a case where the facsimile is sent and e-mail including the sending permission is not received from the authorizing person within a designated time, the system control part 201 sends e-mail to a deputy authorizing person who is registered. Because of this, since resending to a different person is implemented if the authorization is not obtained within a designated time, it is possible to prevent the authorization being delayed to the point that the facsimile transmission cannot be made.

In addition, a time setting part is provided in the facsimile device so as to set a time for a designated time out. Hence, it is possible to implement a process which follows the intent of the user.

The present invention is not limited to these embodiments, but variations and modifications may be made without departing from the scope of the present invention.

This patent application is based on Japanese Priority Patent Application No. 2005-259436 filed on Sep. 7, 2005, the entire contents of which are hereby incorporated by reference.

What is claimed is:

1. A communication device, comprising:

a network control device to connect to a Public Switched Telephone Network (PSTN);

an interface to connect to an IP network;

an operations control part configured to set a first address corresponding to the PSTN and at least one second address corresponding to the IP network for at least one authorizing person who provides sending permission; and a system control part configured to send information to the first address corresponding to the PSTN;

determine whether the sending permission is necessary;

send, when it is determined that the sending permission is necessary, a first e-mail including the first address corresponding to the PSTN to the at least one second address of the at least one authorizing person; and send the information to the first address corresponding to the PSTN when a second e-mail including the sending permission from the at least one authorizing person is received.

2. The communication device as claimed in claim 1, wherein the system control part is configured to determine that the sending permission is not necessary when the first address is registered in advance.

3. The communication device as claimed in claim 1, further comprising:

a password identification part configured to identify a password that is input, wherein the system control part is configured to determine whether the sending permission is necessary based on a result of the password that is input.

4. The communication device as claimed in claim 1, wherein the system control part is further configured:

to send a stored file corresponding to a reference of the first e-mail to the PSTN;

to send an e-mail to an opponent of a next authorization;

to send the stored file when the first address corresponding to the stored file is changed to another address of the PSTN;

to send a status of the stored file in an e-mail to a sender in response to a request for the status from the sender; or to delete the stored file and to send an e-mail indicating the deletion to the sender and the at least one authorizing person, based on at least one of the reference of the received first e-mail, the sender of the received first e-mail, and a text of the received first e-mail.

5. The communication device as claimed in claim 1, wherein the system control part is configured to send the first address corresponding to the PSTN and a name of an opponent to the at least one authorizing person simultaneously.

6. The communication device as claimed in claim 1, wherein the system control part is configured to send the first address corresponding to the PSTN and an indication that one of one-touch dialing, shortened dialing, and manual input has been received by the operations control part to the at least one authorizing person.

7. The communication device as claimed in claim 1, further comprising:

a storing part configured to store the at least one second address corresponding to an e-mail address of the at least one authorizing person, wherein the system control part is configured to set the e-mail address of the at least one authorizing person that is set in advance and stored in the storing part and to request the authorization by a designated protocol, when the information is to be sent to the first address.

8. The communication device as claimed in claim 7, wherein the storing part is configured to store the e-mail address of the at least one authorizing person linked with a sender, and the system control part is configured to request the at least one authorizing person linked to the sender to authorize the transmission by the designated protocol, when the information is to be sent to the first address.

9. The communication device as claimed in claim 1, wherein the system control part is configured to send an e-mail indicating deletion of the information to the at least one authorizing person, when the information to be sent is deleted before the system control part receives the second e-mail including the sending permission from the at least one authorizing person.

10. The communication device as claimed in claim 1, further comprising:

a storing part configured to store a time when the at least one authorizing person provides the sending permission, wherein the system control part is configured to send an e-mail indicating the at least one authorizing person and the time when the at least one authorizing person provided the sending permission or to output a communication report identifying the at least one authorizing person and the time when the at least one authorizing person provided the sending permission.

11. The communication device as claimed in claim 1, wherein the system control part is configured to re-send an e-mail to a sender and the authorizing person, to delete the information to be sent and to send the sender an e-mail indicating the deletion, or to delete the information to be sent and to output or send a transmission result report, when the second e-mail including the sending permission is not received from the at least one authorizing person within a designated time.

12. The communication device as claimed in claim 1, wherein the operations control part is configured to set a deputizing authorizing person; and the system control part is configured to send a third e-mail to the deputizing authorizing person, when the second e-mail including the sending permission is not received from the at least one authorizing person within a designated time.

13. The communication device as claimed in claim 11, further comprising:

a time setting part configured to set the designated time.

14. The communication device as claimed in claim 12, further comprising:

a time setting part configured to set the designated time.

15. A communication device, comprising:

a network control device to connect to a Public Switched Telephone Network (PSTN);

an interface to connect to an IP network;

means for setting a first address corresponding to the PSTN and at least one second address corresponding to the IP network for at least one authorizing person who provides sending permission;

means for sending information to the first address corresponding to the PSTN;

means for determining whether the sending permission is necessary;

means for sending, if the sending permission is necessary, a first e-mail including the first address corresponding to the PSTN to the at least one second address of the at least one authorizing person; and means for sending the information to the first address corresponding to the PSTN when a second e-mail including the sending permission from the at least one authorizing person is received.

* * * * *